US008115779B2

(12) United States Patent (10) Patent No.: US 8,115,779 B2
Ackermann (45) Date of Patent: Feb. 14, 2012

(54) COLOR CONTROL OF WHITE LED LAMPS

(75) Inventor: Bernd Ackermann, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 899 days.

(21) Appl. No.: 11/911,089

(22) PCT Filed: Apr. 11, 2006

(86) PCT No.: PCT/IB2006/051096
§ 371 (c)(1),
(2), (4) Date: Oct. 9, 2007

(87) PCT Pub. No.: WO2006/109237
PCT Pub. Date: Oct. 19, 2006

(65) Prior Publication Data
US 2008/0169770 A1    Jul. 17, 2008

(30) Foreign Application Priority Data

Apr. 14, 2005  (EP) .................................. 05102945

(51) Int. Cl.
*G09G 5/02* (2006.01)
(52) U.S. Cl. ......... 345/604; 345/589; 345/591; 345/593
(58) Field of Classification Search ............... 345/604, 345/589, 591, 593
See application file for complete search history.

(56) References Cited

U.S. PATENT DOCUMENTS

| | | | | |
|---|---|---|---|---|
| 4,253,037 A * | 2/1981 | Driessen et al. | ................. | 313/25 |
| 4,727,283 A * | 2/1988 | van Kemenade et al. | ..... | 313/487 |
| 5,231,504 A * | 7/1993 | Magee | .......................... | 358/500 |
| 5,334,992 A * | 8/1994 | Rochat et al. | ................... | 345/22 |
| 5,851,063 A | 12/1998 | Doughty | | |
| 5,909,220 A * | 6/1999 | Sandow | ........................ | 345/589 |
| 6,262,710 B1 * | 7/2001 | Smith | ............................ | 345/589 |
| 6,580,097 B1 * | 6/2003 | Soules et al. | .................. | 257/100 |
| 7,374,327 B2 * | 5/2008 | Schexnaider | ................. | 362/613 |
| 2002/0097000 A1 | 7/2002 | Muthu | | |
| 2004/0105261 A1 * | 6/2004 | Ducharme et al. | ............ | 362/231 |
| 2004/0184256 A1 * | 9/2004 | Blanchard | ....................... | 362/31 |
| 2006/0071589 A1 * | 4/2006 | Radkov | ....................... | 313/487 |
| 2006/0098077 A1 * | 5/2006 | Dowling | ....................... | 347/130 |
| 2006/0104058 A1 * | 5/2006 | Chemel et al. | ................ | 362/231 |
| 2006/0108930 A1 * | 5/2006 | Brock et al. | .................. | 313/640 |
| 2006/0138937 A1 * | 6/2006 | Ibbetson | ....................... | 313/502 |
| 2007/0012928 A1 * | 1/2007 | Peng et al. | ....................... | 257/79 |

FOREIGN PATENT DOCUMENTS

WO      0195544      12/2001

OTHER PUBLICATIONS

Chhajed et al.; Influence of Junction Temperature on Chromaticity and Color-Rendering Properties of Trichromatic White-light Source Based on Light-emitting Diodes; Feb. 16, 2005; Journal of Applied Physics; vol. 97, 054506.*

* cited by examiner

*Primary Examiner* — Xiao M. Wu
*Assistant Examiner* — David T Welch

(57) ABSTRACT

The invention relates to a method and a system for translating a three value color space signal, preferably given in a CIE scale, to an n primary color space signal, where n is an integer greater than or equal to 4, thus providing color controlling of a white light source comprising an array of colored light emitting diodes with respect to maximum CRI and maximum luminous efficiency.

4 Claims, 3 Drawing Sheets

COLOR CONTROL OF WHITE LED LAMPS

The invention relates to a method and a system for translating a three value color space signal, preferably given in a CIE scale, to an n primary color space signal, $n \geq 4$ being an integer. This way there is provided color controlling of a white light source comprising an array of colored light emitting diodes.

LED (Light emitting diode) white light sources are expected to have a major impact on the general lighting market. White LED lamps based on additive color mixing have distinct advantages compared to white LED lamps based on phosphor-conversion: higher luminous efficacy and higher luminous efficiency, better color rendering properties usually quantified as a higher CRI (color rendering index), adjustable color temperature, possibility to produce variable colored light.

These LED lamps have to be optimized to find the best possible trade-off between a large system efficiency usually quantified as a large luminous efficacy or a large luminous efficiency and good color rendering properties usually quantified as a large CRI. The possibility to generate high quality white light in this sense is of utmost importance for any white LED lamp based on additive color mixing. The luminous efficacy, expressed in lumen/Watt is the ratio between the total luminous flux emitted by the lamp and the total optical power emitted by the lamp. The luminous efficiency, also expressed in lumen/Watt is the ratio between the total luminous flux emitted by the lamp and the total power input to the lamp. Luminous efficiency is equal to luminous efficacy multiplied by the efficiency with which electrical power is converted into optical power. A high luminous efficiency of the lamp in accordance with the invention means that a specific quantity of light is obtained at smaller power consumption. Ultimately, a high luminous efficiency is being aimed at. However, quantifying the efficiency with which electrical power is converted into optical power is tedious and it may be both necessary and sufficient to account for it in an approximate way. The CRI is a CIE (Commission Internationale de l'Éclairage) scale used to indicate the color rendering accuracy of a light source compared to a reference source of the same color temperature, and is the average for eight standard colors, $Ra_8$. Expressed on a scale of 1 to 100, a value of 100 indicates no distortion. A low CRI rating indicates that the colors of objects will appear distorted under that particular light source. Mixing more than three colors will be required to achieve a color rendering index larger than about 80. Especially for white LED lamps other quantitative characteristics of good color rendering properties are possible and may be used equally well.

The known color control algorithms are limited to mixing two or three colors or do not optimize the luminous efficiency and/or the CRI. A method for mixing the light of four LED's by proper selection of the wavelength of each LED in order to achieve a CRI of at least $Ra_8 > 85$ is disclosed in U.S. Pat. No. 5,851,063. Such methods are useful for proper illumination of objects for example. However, they are hardly useful in practice due to the large manufacturing spread of LED wavelengths. In US 2002/0097000 there is disclosed a luminary system using three primary colors for providing power to the LED light sources to generate a desired color. There is provided estimation of the lumen output as well as the chromaticity coordinates of a desired light to be generated making use of a memory table. The display of an expanded gamut of colors is known from WO 01/95544 using at least four primaries. A graph or plot is created which includes the primaries used in the display and in addition includes one or more middle points allowing translation of a three value color space signal into a primary color space signal.

However, this is not adequate for illumination, since in addition to making light with the desired color coordinates and brightness, it is equally important to have good color rendering and high luminous efficiency at the same time.

Therefore it is an object of the invention to provide an algorithm for mixing four and more colors for generating light with good color rendering properties and a high luminous efficiency.

The method according to the invention for translating a three value color space signal, preferably given in a CIE scale, to an n primary color space signal, $n \geq 4$ being an integer, uses a chromaticity diagram which is expressed in a two dimensional space, where the two dimensions represent a first value and a second value of the three value color space, the chromaticity diagram including n points $P_1$ through $P_n$, each corresponding to one of the primaries. The method comprises:

mapping at least one point $P_0$ on the chromaticity diagram, the point $P_0$ representing a color and being within a polygon with corner points $P_1$ through $P_n$, mapping n triangular areas on the chromaticity diagram, each triangular area having as its corner points the point $P_0$ and two adjacent points chosen from points $P_1$ through $P_n$, mapping the three value color space signal on the chromaticity diagram as a point $P_x$, determining in which triangle the point $P_x$ is located, the triangle being formed by the point $P_0$ and two points from $P_1$ through $P_n$, using the three colors forming the triangle to create an additive linear combination, solving the additive linear combination by representing the contribution of the color $P_0$ to the n primary color space signal and by representing the contributions of the colors of the two other points to the n primary color space signal, selecting the optimal linear combination for $P_0$ with respect to maximum CRI and maximum luminous efficiency in the stored data, multiplying all contributions to the optimal linear combination for $P_0$ and the contributions of the colors of the two other points to the n primary color space signal by a constant factor to generate a certain brightness representing the third value of the three value color space, displaying the so derived optimal linear combination for $P_x$ by representing the multiplied contributions of the colors of the points $P_1$ through $P_n$.

Whilst a CRI of up to 89 is feasible when mixing three colors, mixing four colors is most efficient for CRI values between 85 and 98, which will meet most needs of general lighting. Mixing five colors results in only slightly larger CRI values. Therefore, mixing four colors, i.e. n=4, will be most suitable for producing white light.

According to a preferred embodiment of the invention the intensity settings of the different colored LED's that result in white light with chromaticity coordinates on or near by the black body line with a large luminous efficiency and a large CRI are pre-calculated and stored in look-up tables. This is done in such a way that these intensities can be retrieved for any color temperature or correlated color temperature, e.g. by interpolation. There is virtually no limit to the number of colors that can be mixed this way since these calculations are performed off-line. In order to generate light with other chromaticity coordinates, one point representing an auxiliary color on or near by the black body line and two primary colors are chosen that form a triangle in the CIE chromaticity diagram containing the desired color. Well-known algorithms for mixing three colors are then applied to this triangle. The method for translating a three value color space signal to an n primary color space signal can be modified by using two auxiliary colors and one primary color or three auxiliary colors instead of one auxiliary color and two primary colors.

The color coordinates x and y in the CIE chromaticity diagram and the brightness of the light to be produced will be specified for a white LED lamp. If three colors are mixed and their wavelengths (or color coordinates) are fixed then their intensities are determined unambiguously and can be calculated immediately from the coordinates x and y and brightness of the light to be produced.

With an algorithm for mixing four or more colors the intensity of at least one auxiliary color is used as a parameter for building a color control algorithm. The auxiliary color with pre-determined color point is obtained by mixing the light of the primary LED colors. The LED color points form a polygon that contains the color point of the auxiliary color. The relative intensities of the colors with the LED color points are determined unambiguously by the color coordinates of the auxiliary color point and the requirement to generate light with good color rendering properties and a high luminous efficiency. Their absolute intensities are proportional to the intensity of the color of the auxiliary color point. The choice of the auxiliary color point depends on the color point of the light that is finally intended to be produced. Each color that can be produced mixing the light of the primary colors available has chromaticity coordinates within one triangle formed by the auxiliary color and two primary colors. The well-known algorithms for mixing three colors are then applied to this triangle.

Executing a real time algorithm requires some computational effort. This is feasible with digital signal processors and microcontrollers. However, depending on practical considerations it may be preferable to use a processor with lower computational power and more memory instead. This involves to do some of the calculations offline and to store their results in look-up tables. The algorithms known so far are not well suited for such a procedure. If more than three colors shall be mixed, then the computational effort resulting from the algorithms may become impractical.

The system according to the invention for translating a three value color space signal, preferably given in a CIE scale, to an n primary color space signal, $n \geq 4$ being an integer, using a chromaticity diagram which is expressed in a two dimensional space, where the two dimensions represent a first value and a second value of the three value color space, the chromaticity diagram including n points $P_1$ through $P_n$, each corresponding to one of the primaries, comprises:

a data storing device for storing CRI and luminous efficiency data for at least one additive linear combination of light of the primary colors with color points $P_1$ through $P_n$ resulting in light with color point $P_0$ for at least one point $P_0$ on the chromaticity diagram, the point $P_0$ representing a color and being within a polygon with corner points $P_1$ through $P_n$, a controller for determining in which triangle the point $P_x$ representing the three value color space signal is located, the triangle being formed by the point $P_0$ and two points from $P_1$ through $P_n$ and creating an additive linear combination of the contribution of the color $P_0$ to the n primary color space signal and the contributions of the colors of the two other points to the n primary color space signal, the controller for selecting the optimal linear combination for $P_0$ with respect to maximum CRI and maximum luminous efficiency by use of the stored data from the data storing device.

Embodiments of the invention will be discussed as examples and illustrated by the accompanying figures, in which FIG. 1 depicts a chromaticity mapping for converting source data to calculate the contribution levels of primaries according to an embodiment of the present invention;

Figure 1:
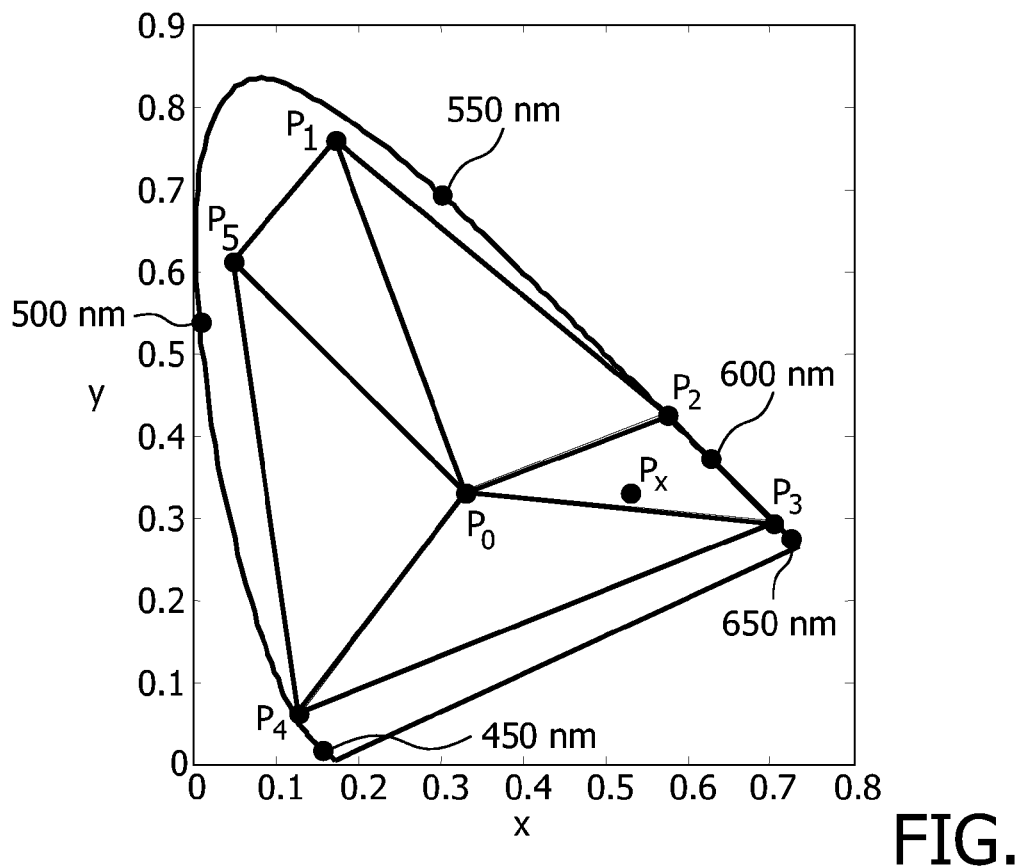
Figure 4:
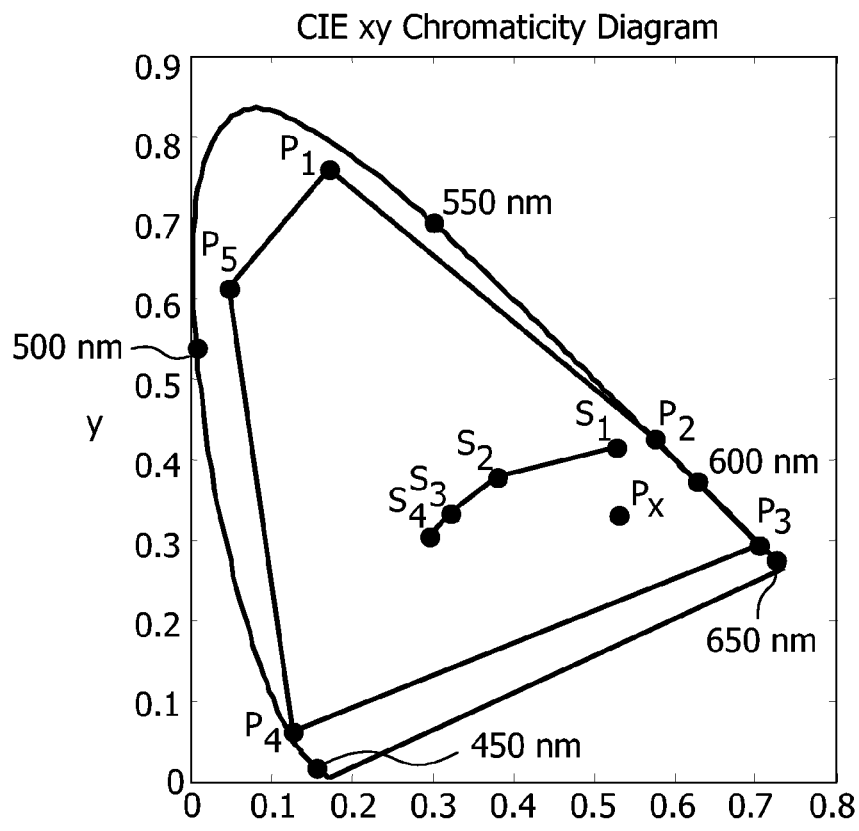
Figure 5:
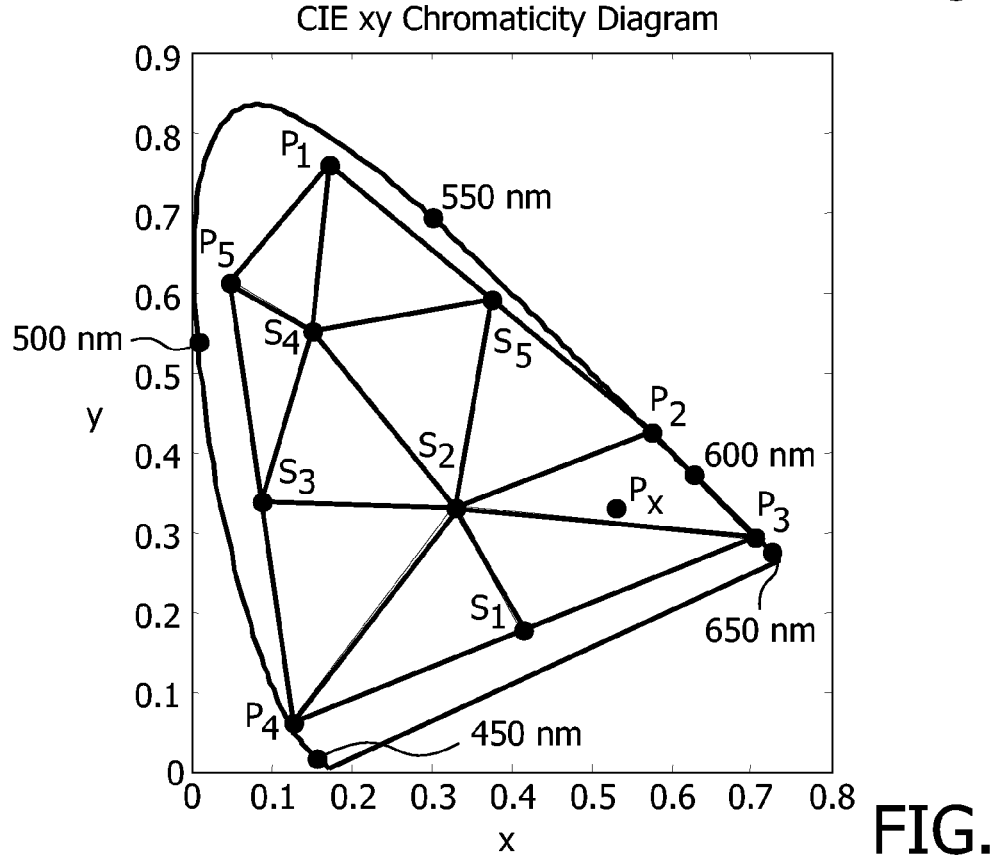

FIG. 4 illustrates the same chromaticity mapping as in FIG. 1, showing an embodiment of the invention, starting with more than one point $P_0$ FIG. 5 illustrates the same chromaticity mapping as in FIG. 1, showing an embodiment of the invention, using several points S1; S2, S3, . . . S5 instead of one point $P_0$.

FIG. 1 depicts a chromaticity mapping for converting source data to calculate the contribution levels of primaries according to an embodiment of the present invention. A point $P_0$ at or close to the black body line is chosen, preferably by specifying a color temperature. The intensities of the pure colors $P_1$, $P_2$, $P_3$, $P_4$ and $P_5$ resulting in light with this color and a large luminous efficacy and a large CRI that have been pre-calculated and stored in look-up tables are retrieved and, if necessary, interpolated. $P_1$ represents a green LED, $P_2$ represents a yellow LED, $P_3$ stands for a red LED, $P_4$ stands for a blue LED and $P_5$ represents a cyan LED. If one LED doesn't have the power to generate the desired light, e.g. for thermal reasons or current limitations, then several LED's of the same color can be used. The object of an applied algorithm is now to determine brightness values $Y_1, \ldots, Y_5$ of the LED's $P_1, \ldots, P_5$ to generate light with color point $P_x$ and brightness $Y_x$ with good luminous efficiency and CRI where $Y_x = Y_1 + Y_2 + Y_3 + Y_4 + Y_5$. Multiplying the brightness values $Y_1, \ldots, Y_5$ of the LEDs with a constant factor will result in the brightness $Y_x$ of the mixed light being multiplied by the same factor, not influence the color point $P_x$, not influence the CRI and not influence or only influence slightly the luminous efficiency depending on the method used to adjust the brightness of the LEDs.

If the chromaticity coordinates of the pure colors $P_1$, $P_2$, $P_3$, $P_4$ and $P_5$ move, e.g. due to temperature variations, then these pre-calculated values will also be used. This results in an color with chromaticity coordinates not on but close to the black body line. The error introduced by this deviation will be small. The algorithm ensures that the chromaticity coordinates of any desired light are correct. There will only be small differences in the color rendering index and luminous efficiency. Each color that can be produced mixing the light of the pure colors available has chromaticity coordinates within one triangle formed by the auxiliary color and two pure colors. The well-known algorithms for mixing three colors are applied to this triangle.

Figure 2:
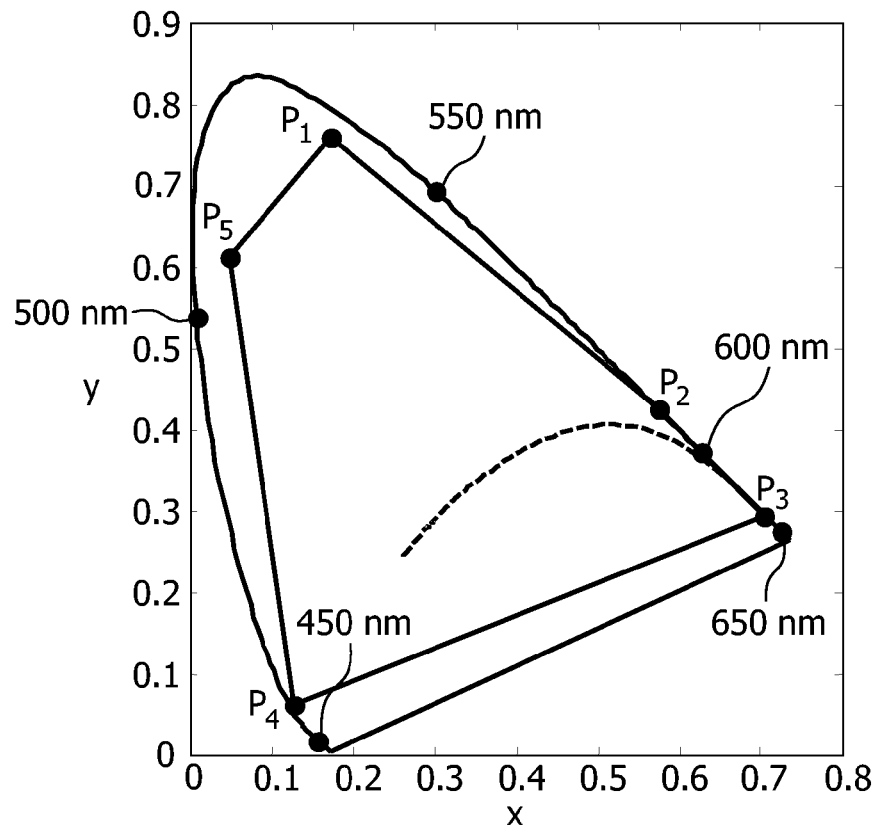
FIG. 2 illustrates the same chromaticity mapping as in FIG. 1, showing the black body line.

FIG. 2 illustrates the same chromaticity mapping as in FIG. 1 but instead of a point $P_x$ or a point $P_0$ at or close to the black body line there is shown the black body line itself as dashed line.

Figure 3:
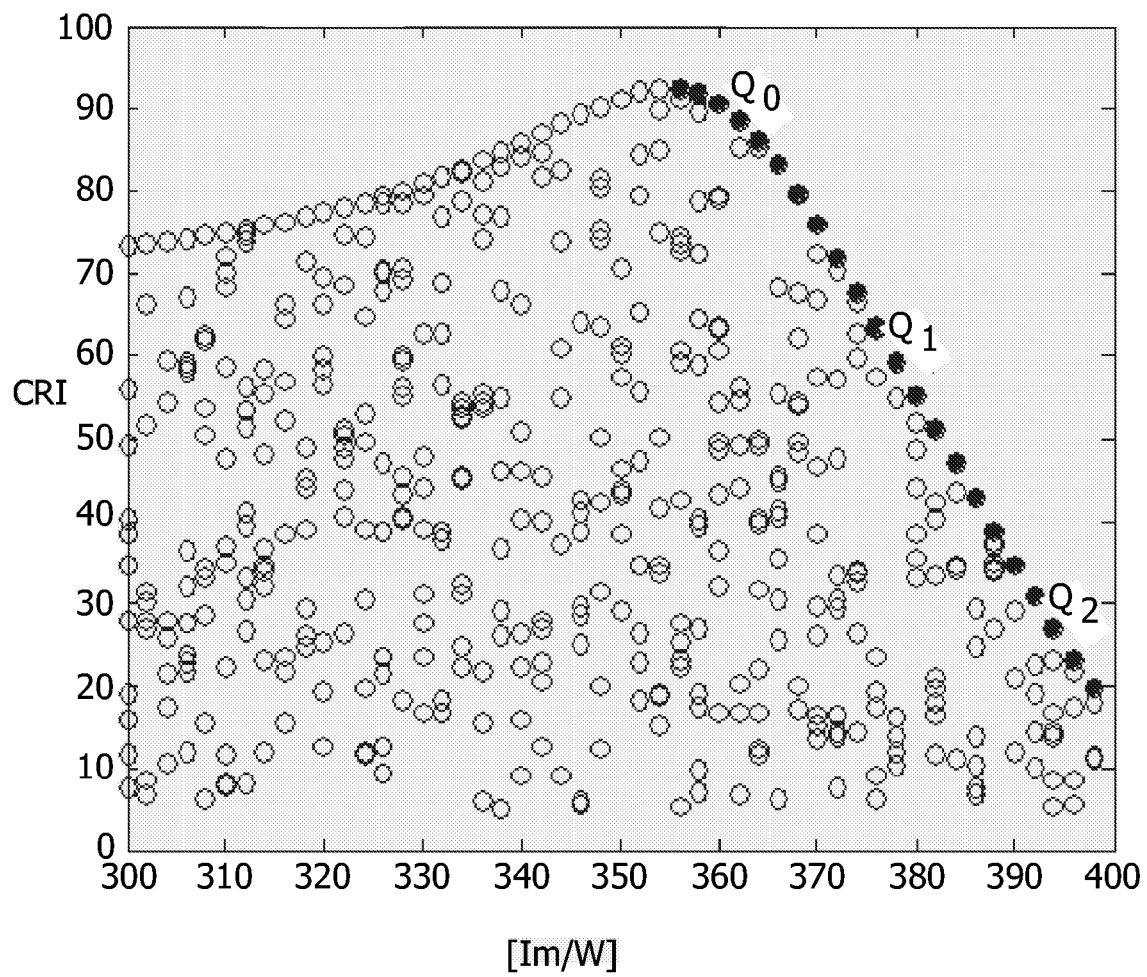
FIG. 3 shows a diagram with values of CRI and luminous efficacy ([lm/W]) achieved by certain linear combinations f primary colors, all resulting in the same color characterized by its color coordinate and brightness.

FIG. 3 shows a diagram with values of CRI and luminous efficacy ([lm/W]) achieved by certain linear combinations Q of primary colors all resulting in the same color characterized by its color coordinate and brightness. The more interesting linear combinations are those corresponding to the black dots, which are on the borderline of the area of all dots, i.e. which correspond to an optimum in the sense that there is no other combination with both a larger CRI and a larger luminous efficacy. Depending on the importance of either one of those values to be a maximum, $Q_0$, $Q_1$ and $Q_2$ amongst the black dots are examples of adequate choices, $Q_0$ in case maximum CRI is of higher importance, $Q_2$ in case maximum luminous efficacy is of higher importance, and $Q_1$ in case a compromise between them is being sought.

FIG. 4 illustrates the same chromaticity mapping as in FIG. 1, showing an embodiment of the invention, starting with more than one point $P_0$.

The point $P_0$ shown in FIG. 1 required to control making light with color point $P_x$ would be placed on the line connecting $S_1$ and $S_2$. The points $S_1$, $S_2$, $S_3$, $S_4$ are on or close to the black body line. The intensities of the LEDs for $P_0$ would be derived by interpolation from those calculated in advance and stored for $S_1$, $S_2$, $S_3$, and $S_4$.

FIG. 5 illustrates the same chromaticity mapping as in FIG. 1, showing an embodiment of the invention, using several points $S_1$, $S_2$, $S_3$, . . . $S_5$ instead of one point $P_0$.

Every color that can be made is in one triangle. E.g. $P_x$ is in the triangle $S_2$ $P_2$ $P_3$. Light with these 3 colors is mixed as already outlined in order to obtain light with color $P_x$ and the desired intensity. The intensities of the LEDs are calculated in advance and stored for $S_1$, $S_2$, $S_3$, . . . $S_5$.

The invention claimed is:

1. A method for translating a three value color space signal, given in a CIE scale, to an n primary color space signal, wherein n is an integer greater than or equal to 4, using a chromaticity diagram which is expressed in a two dimensional space, where the two dimensions represent a first value and a second value of the three value color space, the chromaticity diagram including n points $P_1$ through $P_n$ each corresponding to one of a plurality of primary colors, the method comprising:

mapping at least one point $P_0$ on the chromaticity diagram, the at least one point $P_0$ representing a color and being within a polygon with the points $P_1$ through $P_n$, mapping n triangular areas on the chromaticity diagram, each triangular area having as its corner points the at least one point $P_0$ and two adjacent points chosen from the points $P_1$ through $P_n$, mapping the three value color space signal on the chromaticity diagram as a point $P_x$, determining, by a controller, in which triangle the point $P_x$ is located, the triangle being formed by the at least one point $P_0$ and two points from the points $P_1$ through $P_n$, using the three colors forming the triangle to create an additive linear combination, solving the additive linear combination by representing the contribution of the at least one point $P_0$ to the n primary color space signal and by representing the contributions of the colors of the two other points to the n primary color space signal, selecting the optimal linear combination for the at least one point $P_0$, the optimal linear combination including one of a maximum color rendering index (CRI) and a maximum luminous efficiency for a given value of the other based on stored data, the stored data including a plurality of pre-calculated values of CRI and luminous efficiency for the at least one point $P_0$, multiplying all contributions to the optimal linear combination for the at least one point $P_0$ and the contributions of the colors of the two other points to the n primary color space signal by a constant factor to generate a certain brightness representing the third value of the three value color space, displaying the so derived optimal linear combination for $P_x$ by representing the multiplied contributions of the colors of the points $P_1$ through $P_n$.

2. A method according to claim 1 wherein the at least one point $P_0$ is approximately on a black body line.

3. A system for translating a three value color space signal, given in a CIE scale, to an n primary color space signal, wherein n is an integer greater than or equal to 4, using a chromaticity diagram which is expressed in a two dimensional space, where the two dimensions represent a first value and a second value of the three value color space, the chromaticity diagram including n color points $P_1$ through $P_n$, each corresponding to one of a plurality of primary colors, the system comprising:

a data storing device for storing pre-calculated color rendering index (CRI) and luminous efficiency data for at least one additive linear combination of light of the primary colors with the color points $P_1$ through $P_n$ resulting in light with a color point $P_o$ on the chromaticity diagram, the color point $P_0$ representing a color and being within a polygon with corners at the color points $P_1$ through $P_n$, a controller for determining in which triangle a point $P_x$ representing the three value color space signal is located, the triangle being formed by the color point $P_0$ and two points from the color points $P_1$ through $P_n$ and creating an additive linear combination of the contribution of the color point $P_0$ to the n primary color space signal and the contributions of the colors of the two other points to the n primary color space signal, the controller for selecting the optimal linear combination for the color point $P_0$, the optimal linear combination including one of a maximum CRI and a maximum luminous efficiency for a given value of the other based on the pre-calculated and stored CRI and luminous efficiency data from the data storing device.

4. A system for translating a three value color space signal, given in a CIE scale, to an n primary color space signal, wherein n is an integer greater than or equal to 4, using a chromaticity diagram which is expressed in a two dimensional space, where the two dimensions represent a first value and a second value of the three value color space, the chromaticity diagram including n color points $P_1$ through $P_n$, each corresponding to one of a plurality of primary colors, the system comprising:

a data storing device for storing pre-calculated color rendering index (CRI) and luminous efficiency data for at least one additive linear combination of light of the primary colors with the color points $P_1$ through $P_n$ resulting in light with a color point $P_0$ on the chromaticity diagram, the color point $P_0$ representing a color and being within a polygon with corners at the color points $P_1$ through $P_n$, a controller for determining in which triangle a point $P_x$ representing the three value color space signal is located, the triangle being formed by the color point $P_0$ and two points from the color points $P_1$ through $P_n$ and creating an additive linear combination of the contribution of the color point $P_0$ to the n primary color space signal and the contributions of the colors of the two other points to the n primary color space signal, the controller for selecting the optimal linear combination for the color point $P_0$, the optimal linear combination including one of a maximum CRI and a maximum luminous efficiency for a given value of the other based on the pre-calculated and stored CRI and luminous efficiency data from the data storing device, the maximum luminous efficiency being an efficiency with which electrical power consumed by a lamp is converted into optical power multiplied by a ratio between a total luminous flux emitted by the lamp and a total power input to the lamp.

* * * * *